(12) United States Patent
Kagoura et al.

(10) Patent No.: US 9,006,574 B2
(45) Date of Patent: Apr. 14, 2015

(54) UNDERSEA CABLE, MULTILAYER TAPE FOR WATER SHIELDING LAYER OF UNDERSEA CABLE, AND METHOD FOR IMPROVING FATIGUE CHARACTERISTICS OF UNDERSEA CABLE

(71) Applicant: Furukawa Electric Co., Ltd., Chiyoda-ku, Tokyo (JP)

(72) Inventors: Toru Kagoura, Tokyo (JP); Kenichi Ishii, Tokyo (JP); Kei Kaizuka, Tokyo (JP); Takuzo Hagiwara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 14/187,316

(22) Filed: Feb. 23, 2014

(65) Prior Publication Data
US 2014/0166335 A1    Jun. 19, 2014

Related U.S. Application Data

(63) Continuation of application No. PCT/JP2012/071141, filed on Aug. 22, 2012.

(30) Foreign Application Priority Data

Aug. 23, 2011  (JP) .................. 2011-181481
Aug. 6, 2012   (JP) .................. 2012-173974

(51) Int. Cl.
*H01B 7/28* (2006.01)
*B32B 3/28* (2006.01)
(Continued)

(52) U.S. Cl.
CPC .............. *H01B 7/2806* (2013.01); *H01B 7/045* (2013.01); *H01B 7/2825* (2013.01); *B32B 3/28* (2013.01); *H01B 7/12* (2013.01)

(58) Field of Classification Search
USPC .......................................... 174/107; 428/179
See application file for complete search history.

(56) References Cited

U.S. PATENT DOCUMENTS 4,256,921 A     3/1981  Bahder
4,703,134 A  * 10/1987  Uematsu ................. 174/106 SC
(Continued)

FOREIGN PATENT DOCUMENTS

CN        202042240 U  * 11/2011
CN    201120089799 U  * 11/2011
(Continued)

OTHER PUBLICATIONS

International Search Report for PCT/JP2012/071141 mailed Nov. 20, 2012.
(Continued)

*Primary Examiner* — Timothy Thompson
*Assistant Examiner* — Charles Pizzuto
(74) *Attorney, Agent, or Firm* — Lowe Hauptman & Ham, LLP

(57) ABSTRACT

A power line core in an undersea cable includes a conducting member, an insulating member, a shield layer, a water shielding layer, an anticorrosion layer and the like. The insulating member is provided on an outer periphery portion of the conducting member. The insulating member is made of, for example, crosslinked polyethylene. The shield layer is provided on an outer periphery of the insulating member. The water shielding layer is provided on an outer periphery portion of the shield layer. The water shielding layer includes a multilayer tape in which a metal layer is sandwiched by resin layers. The anticorrosion layer is provided on an outer periphery portion of the water shielding layer. In the cross section of the multilayer tape, the metal layer has a corrugated shape.

14 Claims, 13 Drawing Sheets

(51) Int. Cl.
*H01B 7/12* (2006.01)
*H01B 7/04* (2006.01)
*H01B 7/282* (2006.01)

(56) References Cited

U.S. PATENT DOCUMENTS

| | | |
|---|---|---|
| 5,043,538 A | 8/1991 | Hughey, Jr. et al. |
| 5,486,649 A | 1/1996 | Gareis |
| 2006/0038699 A1* | 2/2006 | Dodge et al. ............... 340/854.8 |

FOREIGN PATENT DOCUMENTS

| | | | |
|---|---|---|---|
| DE | 1988-220980 | * | 8/1988 |
| DE | 3702182 | * | 8/1988 |
| DE | 3702182 A | * | 8/1988 |
| GB | 2101392 A | | 1/1983 |
| GB | 2135812 A | | 9/1984 |
| JP | 59126631 U | | 8/1984 |
| JP | 62129711 U | | 8/1987 |
| JP | 06-326525 | * | 11/1994 |
| JP | 6325625 A | | 11/1994 |
| JP | 2004192831 A | | 7/2004 |
| JP | 2008300093 A | | 12/2008 |
| JP | 201279692 A | | 4/2012 |

OTHER PUBLICATIONS

Extended European Search Report issued Feb. 3, 2015, corresponding to European patent application No. 12826383.7.

* cited by examiner (a)

(b)

(a)

(b)

(a)

(b)

(a)

(b)

(a)

(b)

UNDERSEA CABLE, MULTILAYER TAPE FOR WATER SHIELDING LAYER OF UNDERSEA CABLE, AND METHOD FOR IMPROVING FATIGUE CHARACTERISTICS OF UNDERSEA CABLE

RELATED APPLICATIONS

The present application is a continuation of Application Number PCT/JP2012/071141, filed Aug. 22, 2012, which claims priority from, Japanese Applications Numbers 2011-181481, filed Aug. 23, 2011, and 2012-173974, filed Aug. 6, 2012, the disclosure of each application is hereby incorporated by reference herein in their entirety.

TECHNICAL FIELD

The present invention relates to undersea cables and the like for offshore floating facilities.

BACKGROUND ART

In recent years, renewable energy has been developed to take measures against global warming. For example, practical application of floating offshore wind power generation has been promoted in which power is transmitted from wind turbines as offshore floating facilities.

To transmit power from offshore floating facilities, undersea cables are used. The undersea cables have the following structure. Three power line cores are twisted together for three-phase alternating-current power transmission, and wire armor lines are provided on an outer periphery of the cores to support the cable load. An outermost portion is coated with a plastic layer by extrusion coating to prevent external damages.

Examples of such undersea cables include an undersea cable in which a wire armor member is provided on an outer periphery of a linear aggregated member. The linear aggregated member is formed by twisting cable cores and twist reinforcing wires together in one direction. The wire armor member is formed by twisting wire armor lines together in a direction that is opposite to the direction in which the cable cores and the twist reinforcing wires are twisted together. Accordingly, when the wire armor member is provided on the outer periphery of the linear aggregated member, the twisting torque acting on the linear aggregated member and the wire armor member is cancelled to balance the torque (Patent Document 1).

PRIOR ART DOCUMENT

Patent Documents

[Patent Document 1] JP 2004-192831 A

SUMMARY OF THE INVENTION

Technical Problem

Since the undersea cables are to be installed under the sea, the power line cores in the undersea cables are required to have high water shielding properties. Thus, a water shielding layer is formed on an outer periphery of an insulating member (shield layer) of a power line core.

Meanwhile, the undersea cables are to be suspended into the sea from offshore floating facilities that repeatedly move offshore. Due to the fluid force and floating movements caused by tides and waves, the undersea cables are repeatedly deformed all the time. Accordingly, the power line cores are also repeatedly deformed.

However, if a metal layer such as a metal tape is used to provide water shielding properties to the power line cores, it becomes difficult to follow the repeated deformation. This may damage the metal layer constituting the water shielding layer. Therefore, the fatigue life of the conventional water shielding layer structures is said to be about 5 to 7 years, although it depends on the sea climate conditions.

The present invention is in view of the above problems and is aimed at providing undersea cables that are excellent in flexural fatigue characteristics of water shielding layers with sufficient flexibility and high water shielding properties.

Technical Solution

To achieve the above aim, a first invention is directed to an undersea cable for offshore floating facilities, including at least: a power line core in which an insulating layer, a shield layer, a first water shielding layer, and an anticorrosion layer are formed on a conductor; a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and an outer anticorrosion layer formed on an outer periphery side of the wire armor member. The first water shielding layer is formed using a multilayer tape in which a metal layer is sandwiched by resins. A cross sectional shape of the metal layer of the multilayer tape is a corrugated shape or a convex-concave shape.

Desirably, the shape of convex-concave of the metal layer is formed such that on a plane surface of the multilayer tape, mountain portions or valley portions of the convex-concave shape are alternately and continuously repeated toward two different directions. Alternatively, on a plane surface of the multilayer tape, wave crest portions of the corrugated shape may be formed toward one direction.

Desirably, the corrugated shape or the convex-concave shape of the metal layer is a smoothly-curved wave, a trapezoidal square wave, or a triangular wave. A portion near a wave crest portion or a wave base portion of each of the corrugated shape and the convex-concave shape is formed with a smoothly-curved line, and a direction in which the corrugated shape or the convex-concave shape is expandable and contractible is substantially the same as an axial direction of the undersea cable.

Desirably, a height of the corrugated shape or the convex-concave shape of the metal layer is 0.2 mm to 0.6 mm, and a pitch of the corrugated shape or the convex-concave shape of the metal layer is 1.5 mm to 4 mm.

At least the resin of the multilayer tape on an inner surface side may be a conductive resin layer configured to be conductive with the shield layer, and the resin of the multilayer tape on an outer surface side may be compatible with the anticorrosion layer and may have a lower melting point than a melting point of the anticorrosion layer.

An adhesive layer may be formed on an outer surface of the resin of the multilayer tape on an outer surface side, and the adhesive layer and the anticorrosion layer may be bonded together.

A second water shielding layer may be formed on an inner surface of the outer anticorrosion layer, and the second water shielding layer may be formed using the multilayer tape.

The multilayer tape may be wound to have both end portions of the multilayer tape in a width direction overlapping each other such that a longitudinal direction of the multilayer tape is substantially the same as the axial direction of the power line cores and a width direction of the multilayer tape is the same as the circumferential direction of the power line cores. An overlapping portion of the multilayer tape may be extensible in the axial direction of the power line cores, and a direction in which wave crest portions of the corrugated shape or the convex-concave shape are formed may be substantially the same as the circumferential direction of the power line cores.

The multilayer tape may be wound helically such that a longitudinal direction of the multilayer tape is at a predetermined angle with respect to the axial direction of the power line cores, and a direction in which wave crest portions of the corrugated shape or the convex-concave shape are formed may be substantially the same as the circumferential direction of the power line cores.

According to the first invention, the water shielding layer is formed using the multilayer tape in which the metal layer is sandwiched by the resin. Thus, penetration of water from the outside can reliably be prevented. Therefore, a deterioration of insulation performance of the cables due to water can be prevented for a long period of time.

Further, since the metal layer is sandwiched by the resin, the metal layer is not likely to be damaged or bent at the time of forming the water shielding layer. This enables reliable formation of the water shielding layer. Furthermore, the metal layer is not likely to damage the inner shield layer.

Further, since the cross sectional shape of the metal layer of the multilayer tape is a corrugated shape or a convex-concave shape, while the multilayer tape is wound, the multilayer tape (metal layer) can be deformed in the direction in which the corrugated shape or the convex-concave shape is formed. This prevents the multilayer tape from inhibiting deformation associated with the flexibility of the undersea cable (power line core) when the multilayer tape is wound.

Further, the undersea cable is not only bent repeatedly but also expanded and contracted repeatedly in the circumferential direction. For example, the electric current passing through the undersea cable changes in response to a change in the amount of power generated by the offshore wind firm. This changes the amount of heat generated in the conducting member. Especially when the load increases due to strong wind in abnormal weather change, the conducting member of the cable generates a large amount of heat. Due to the temperature change, the undersea cable expands and contracts in the radial direction. At this time, the multilayer tape expands and contracts repeatedly in the circumferential direction in response to the expansion and contraction in the radial direction. Further, the undersea cable may move under the sea due to ocean currents and waves to repeat unstable movement. In this case, some torsional stress may also be applied in addition to bending stress.

However, since the cross sectional shape of the metal layer of the multilayer tape is the corrugated shape or the convex-concave shape, the water shielding layer can follow deformation not only in the bending direction but also in the radial direction. Thus, the stress applied to the metal layer can be reduced to improve fatigue resistance.

Especially, when the cross sectional shape of the metal layer of the multilayer tape is the convex-concave shape formed in two directions, the water shielding layer can more reliably follow not only deformation in the bending direction but also in the radial direction. Furthermore, when the metal layer has the convex-concave shape in two directions, even if the deformation to be applied to the cable is only the bending deformation in the axial direction, some of the distortion caused by the deformation of the cable is consequently dispersed and averaged in the circumferential direction. Thus, the dispersibility of the distortion in the axial direction improves. Therefore, the stress applied to the metal layer can be reduced to further improve fatigue resistance. Accordingly, when the cross sectional shape of the metal layer of the multilayer tape is the convex-concave shape formed in two directions, it produces an effect of absorbing and reducing not only the deformation resulting from expansion and contraction in the radial direction due to a rapid load change in the amount of power generated by the wind firm and a seasonal change in seawater temperature but also torsional stress caused by ocean currents and waves. It also produces an effect of improving fatigue characteristics associated with cable expansion and contraction in the circumferential direction.

As used herein, the phrase "mountain portions or valley portions are formed at lattice positions" refers to arrangement of the mountain portions or the valley portions such that the mountain portions or the valley portions are alternately and continuously formed repeatedly in two different directions, whereby the centers of the mountain portions or the valley portions are respectively positioned at lattice positions in the periodical structure. In this case, the "lattice arrangement" encompasses the shape in which the thickness of the metal layer is not constant and the sheet thickness changes from the mountain portions to the valley portions to cause a change in thickness of the metal layer, and the convex-concave shape other than the so-called corrugated shape is also encompassed within the "lattice arrangement."

As used herein, the phrase "wave crest portions are formed toward one direction" refers to an arrangement in which the cross sectional shape of a first cross section is not a corrugated shape and the cross sectional shape of a second cross section that is perpendicular to the first cross section is a corrugated shape of a predetermined pitch. In other words, the phrase refers to the pattern in which the wave crest portions (mountain portions or valley portions of the corrugated shape) continue in one direction while the mountain portions and the valley portions are repeated in another direction. In this case, the corrugated shape encompasses convex-concave shape in which the thickness of the metal layer is not constant and the sheet thickness changes from the mountain portions to the valley portions to cause a change in thickness of the metal layer.

Further, the multilayer tape is wound such that the longitudinal direction of the multilayer tape is substantially the same as the axial direction of the undersea cable and the width direction of the multilayer tape is the same as the circumferential direction of the undersea cable, and edges of the wound portion in the circumferential direction are overlapped with each other to thereby decrease the overlap length of the metal layers with respect to the total cable length. In other words, the length of the overlapping portion where a space may be formed between the metal layers can be decreased with respect to the total cable length. Further, it is attached and wound longitudinally so that the overlapping portion can be formed straight in the axial direction of the undersea cable. This allows the overlapping portion to be a part of the circumference to facilitate fusion of the overlapping portion, realizing excellent productivity.

Further, if the resin on the inner surface side of the multilayer tape is a conductive resin layer, electrical connection with the shield layer becomes possible. Thus, the ground of the shield layer at an end portion of the undersea cable can electrically be conducted to the metal layer in the multilayer tape.

Further, when the pitch of the corrugated shape or the convex-concave shape of the metal layer is 1.5 mm to 4 mm and the height of the corrugated shape or the convex-concave shape of the metal layer is 0.2 mm to 0.6 mm, excellent flexural characteristics and flexural fatigue characteristics can be obtained. Furthermore, since crushing and the like of the corrugated shape during the processing can be prevented, excellent productivity of the multilayer tape can also be realized.

Further, if the water shielding layer is also formed in the outer anticorrosion layer by use of a multilayer tape in a similar manner to the water shielding layer of the power line core, the water shielding layer that is excellent in flexibility and fatigue resistance can be obtained.

Further, if the resin constituting the water shielding layer is made of a material that is compatible with the anticorrosion layer and has a lower melting point than that of the anticorrosion layer, when the anticorrosion layer is formed by extrusion coating, the anticorrosion layer and the resin portion are fused together by heat fusion so that deviation due to bending and twisting is not likely to occur. To prevent such deviation, the resin constituting the water shielding layer and the anticorrosion layer may be bonded together.

A second invention is directed to a multilayer tape for a water shielding layer of an undersea cable, including: a metal layer; and resin coating portions sandwiching the metal layer, and a cross sectional shape of the metal layer is a corrugated shape or a convex-concave shape.

Desirably, on a plane surface of the multilayer tape, the shape of convex-concave shape of the metal layer is formed in a lattice arrangement or a staggered arrangement in which mountain portions or valley portions of the convex-concave shape are alternately and periodically formed toward two different directions. Alternatively, on a plane surface of the multilayer tape, wave crest portions of the corrugated may be formed toward one direction.

According to the second invention, the water shielding layer of the undersea cable can be formed by use of the multilayer tape for shielding water according to the second invention. In other words, when the water shielding layer is wound and formed around the undersea cable, penetration of water from the outside can reliably be prevented. Therefore, a deterioration of insulation performance of the cables due to water can be prevented for a long period of time. Furthermore, the multilayer tape can be prevented from inhibiting deformation associated with the flexibility of the undersea cable (power line core) when the multilayer tape is wound.

A third invention is directed to a method for improving fatigue characteristics of an undersea cable, in which in the undersea cable according to the first invention, a shape of convex-concave shape arranged in a circumferential direction of the multilayer tape improves fatigue characteristics in a radial direction by expansion and contraction, and a convex-concave shape arranged in a longitudinal direction of the multilayer tape improves fatigue characteristics in an axial direction.

In view of the life of conventional riser cables, the fatigue characteristic (fatigue life) of the undersea cables is desirably at least three to five times longer than the conventional life. Specifically, the fatigue characteristic measured in a flexural fatigue test at a distortion of 2% is desirably $1 \times 10^5$ times or more. As used herein, the phrase "the fatigue characteristic measured in a flexural fatigue test at a distortion of 2% is desirably $1 \times 10^5$ times or more" means that when distortion in an amount of 2% is repeatedly applied, the undersea cable does not fracture $1 \times 10^5$ times or more.

According to the third invention, the cross sectional shape of the metal layer of the multilayer tape is the corrugated shape formed in two different directions so that the water shielding layer can follow deformation not only in the bending direction but also in the radial direction. This makes it possible to reduce stress applied to the metal layer and improve fatigue resistance.

Advantageous Effect of the Invention

The present invention can provide undersea cables that are excellent in flexural fatigue characteristics of water shielding layers with sufficient flexibility and high water shielding properties.

BRIEF DESCRIPTION OF THE DRAWINGS

FIG. 3(*a*) is a perspective view, and FIG. 3(*b*) is a cross sectional view along the direction of arrow A specified in FIG. 3(*a*).

FIG. 4(*a*) is a perspective view, and FIG. 4(*b*) is a plan view.

FIG. 8(*a*) is a perspective view, and FIG. 8(*b*) is a front pattern diagram.

DETAILED DESCRIPTION OF PREFERRED EMBODIMENTS

Figure 1:
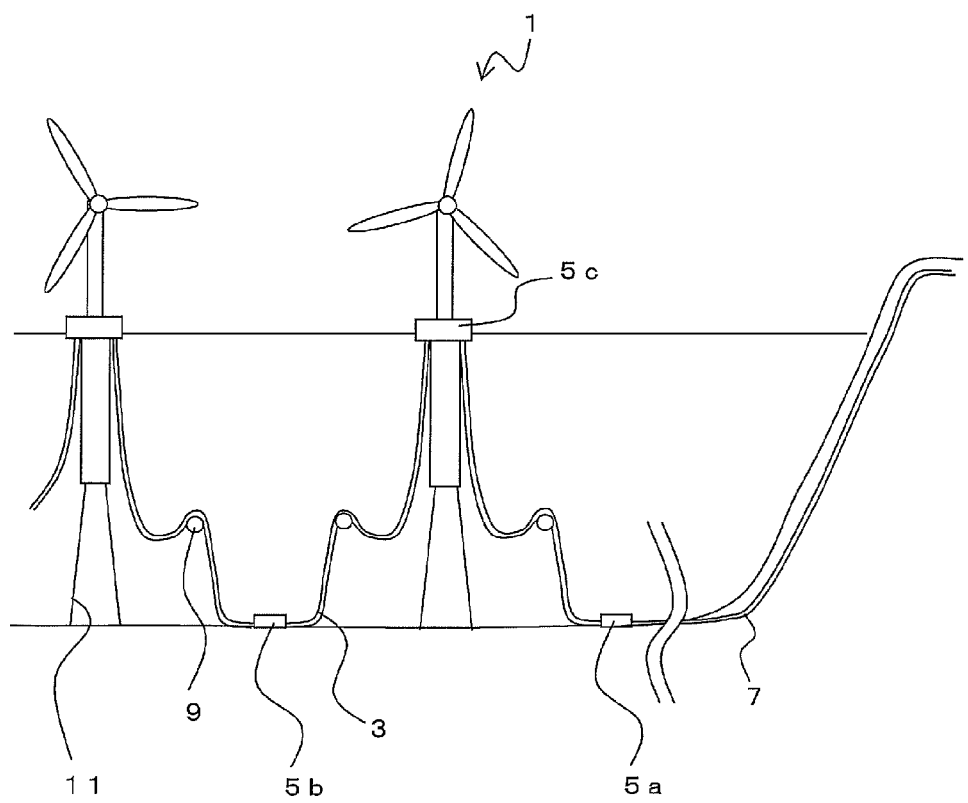
FIG. 1 A figure illustrating a state in which undersea cables 3 are installed.

The following describes undersea cables and the like according to an embodiment of the present invention. FIG. 1 illustrates a state in which undersea cables 3 are installed. Offshore floating facilities 1 are installed offshore. The offshore floating facilities 1 are, for example, floating offshore wind power stations. The offshore floating facilities 1 are floated offshore, with the bottom of the offshore floating facilities 1 being anchored to the bottom of the sea by moorings 11.

For example, the plurality of offshore floating facilities 1 is installed offshore. The offshore floating facilities 1 are connected to the undersea cables 3 at connecting members 5*c*. The undersea cables 3 are connected to each other at connecting members 5*a* installed at the bottom of the sea. In other words, the offshore floating facilities 1 are connected to each other by the undersea cables 3.

Further, buoys 9 are connected to the undersea cables 3 between the offshore floating facilities 1 and the connecting members 5b. In other words, the undersea cables 3 are suspended in the sea by the buoys 9. Details of the undersea cables 3 will be described below.

The undersea cable 3 on the side close to the land is connected to a submarine cable 7 by a connecting member 5a installed at the bottom of the sea. The submarine cable 7 has substantially the same structure as that of the undersea cable 3. The submarine cable 7 is connected to onshore power transmission facilities and the like. In other words, power generated by the offshore floating facilities 1 is transmitted to onshore facilities via the undersea cables 3 and the submarine cable 7.

The offshore floating facilities 1 are moved up and down significantly by offshore tides, waves and the like. Therefore, the undersea cables 3 connected to the offshore floating facilities 1 follow the movement of the offshore floating facilities 1 and repeatedly receive significant bending deformation in the sea. However, the buoys 9 float the undersea cables 3 in the sea to prevent the undersea cables 3 from being drawn to the bottom of the sea and prevent application of local stress to the undersea cables 3 due to the tides and currents.

Figure 2:
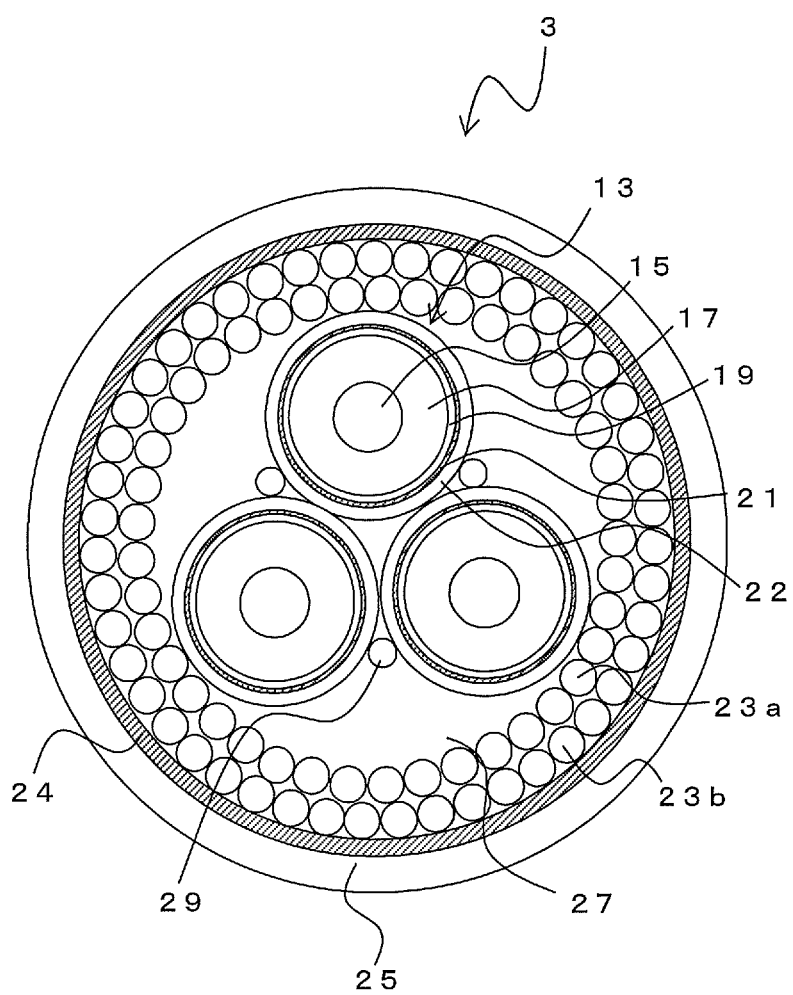
FIG. 2 A cross sectional view of the undersea cable 3.

The following describes the structure of the undersea cable 3. FIG. 2 is a cross sectional view of the undersea cable 3. The undersea cable 3 mainly includes power line cores 13, wire armors 23a and 23b, an outer anticorrosion layer 25 and the like.

Each power line core 13 includes a conducting member 15, an insulating member 17, a shield layer 19, a water shielding layer 21, an anticorrosion layer 22 and the like. The conducting member 15 is made by, for example, twisting copper wires together.

The insulating member 17 is provided on an outer periphery portion of the conducting member 15. The insulating member 17 is made of, for example, crosslinked polyethylene. The insulating member 17 may have a three-layer structure including an inner semiconducting layer, an insulating layer, and an outer semiconducting layer. The three-layer structure including the inner semiconducting layer, the insulating layer, and the outer semiconducting layer can prevent water tree deterioration, which is a partial discharge phenomenon, and can produce an effect as a mechanical buffer layer for an insulating member and a metal layer.

For example, when a conducting member is in direct contact with an insulating member or a shield member is in direct contact with an insulating member, if a contact surface has a projection or the like, an electric field is concentrated on the projection or the like, and the projection or the like becomes a point at which water treeing and partial discharge originate. However, if a semiconducting resin is inserted between the conducting member and the insulating member or between the shield member and the insulating member, the electric field on the contact surface can be reduced. The inner and outer semiconducting layers are sometimes referred to as "electric field reducing layer."

If neither the inner semiconducting layer nor the outer semiconducting layer is provided, a metal layer or the like of the conducting member or the shield member may directly cut into the insulating member. When the metal layer, which is a charging member, cuts into the insulating member, an electric field is concentrated to generate partial discharge, causing insulation breakdown. This problem can be prevented by forming a semiconducting resin layer between the insulating member and the metal layer.

The shield layer 19 is provided on an outer periphery of the insulating member 17. The shield layer 19 is made of a conductive material such as a metal, a conductive resin, and a conductive fiber. The shield layer 19 is connected to the ground at end portions of the undersea cable 3.

The water shielding layer 21 is provided an outer periphery of the shield layer 19. The water shielding layer 21 includes a multilayer tape in which a metal layer and resin layers are layered. The structure of the multilayer tape will be described below.

The anticorrosion layer 22 is provided on an outer periphery portion of the water shielding layer 21. The anticorrosion layer 22 is, for example, made of a resin and formed by extrusion coating on the outer periphery of the water shielding layer 21. The anticorrosion layer 22 is provided to protect each inner layer. Examples of the anticorrosion layer 22 that can be used include those made of uncrosslinked polyethylene, uncrosslinked ethylene-1-butene copolymer, uncrosslinked ethylene-vinyl acetate copolymer, uncrosslinked ethylene-ethyl acrylate copolymer, uncrosslinked ethylene-propylene-diene ternary copolymer, uncrosslinked polyamide resins such as nylon-6,6, nylon-12, and nylon-11, uncrosslinked polyarylate resin, and uncrosslinked polyvinyl chloride resin.

Three power line cores 13 each having the foregoing structure are gathered and twisted together for three-phase alternate power transmission. After the three power line cores 13 are twisted together, a filler layer 27 such as a resin thread is formed in each space between the three power line cores 13 to form a substantially circular core. A wire armor member is provided on an outer periphery of the formed core to support the load of the undersea cable 3. As necessary, a communication cable such as optical cables 29 may be provided in the filler layer 27. To minimize the influence of bending strain originating from deformation of the undersea cable, the optical cable is desirably provided at each of the three positions in the filler layer 27 that are in contact with two anticorrosion layers 22 of adjacent cable conducting members. This arrangement enables stable arrangement of the communication cables and, at the same time, allows the communication cables to be positioned near the center, whereby the stress applied to the communication cables can be reduced.

The wire armor member has, for example, a two-layer structure including wire armors 23a and 23b. The wire armors 23a and 23b are, for example, metal wires (steel wires or stainless-steel wires) or wire rods made of a fiber-reinforced plastic. The plurality of wire armors 23a and 23b of the wire armor member are attached to each other in the circumferential direction and wound around the outer periphery of the core at a long pitch without a space. In other words, the wire armors 23a and 23b are formed such that the winding pitch with respect to the outer diameters of the wire armors 23a and 23b is sufficiently long. The wire armor 23a on the inner periphery side and the wire armor 23b on the outer periphery side are helically wound in the opposite directions to each other around the outer periphery of the core.

As necessary, a water shielding layer 24 is provided on an outer periphery of the wire armor member (wire armors 23a and 23b). The outer anticorrosion layer 25 is provided on an outer periphery of the water shielding layer 24. Alternatively, the water shielding layer 24 may be omitted to provide the outer anticorrosion layer 25 directly on the outer periphery of the wire armor member. The outer anticorrosion layer 25 is, for example, made of a resin and formed by extrusion coating on the outer periphery of the external portion. Examples of resins that can be used to make the outer anticorrosion layer 25 include polyolefin resins and polyamide resins (e.g., polyamide 11, polyamide 12).

The following describes a multilayer tape 30 constituting the water shielding layer 21. FIGS. 3(a) and 3(b) are views illustrating the multilayer tape 30. FIG. 3(a) is a perspective view, and FIG. 3(b) is a cross sectional view of the multilayer tape 30 viewed from direction A specified in FIG. 3(a). The multilayer tape 30 includes a metal layer 31 and resin coating portions 33a and 33b. The metal layer 31 is sandwiched between the resin coating portions 33a and 33b.

The metal layer 31 may be any material that is easy to process into a thin film and has excellent corrosion resistance. For example, stainless-steel, aluminum, copper, lead, clad steel having an outer surface that is clad in corrosion-resistant material and the like can be used. When importance is placed on weight reduction, it is desirable to use stainless-steel, aluminum, clad steel or the like. The thickness of the metal layer 31 is, for example, about 0.05 mm, and the thickness of the multilayer tape 30 as a whole may be, for example, about 0.2 mm to about 1.0 mm.

The resin coating portions 33a and 33b are members made of resin. The resin coating portions 33a and 33b prevent the metal layer 31 from being bent, damaged, wrinkled and the like while the water shielding layer 21 is formed. The material of the resin coating portions 33a and 33b will be described below.

As illustrated in FIG. 3(b), the cross sectional shape of the metal layer 31 is a corrugated shape formed in one direction. To produce such a metal layer 31, for example, a method can be applied in which a metal film is passed through a roll having a corrugated surface to form the corrugated shape on a surface of the metal film. Alternatively, the corrugated shape may be formed by press molding a metal film at predetermined intervals. Alternatively, the corrugated shape may be formed by transfer pressing through several steps while wave crest portions or wave base portions are formed so as to avoid local concentration of distortion.

The multilayer tape 30 can be produced by, for example, extrusion coating a resin on a metal film that has been processed into the corrugated shape. Alternatively, a corrugated metal film may be set in a corresponding molding and then combined with a resin by injection. Alternatively, a resin member and a metal film that have corresponding corrugated shapes may be formed separately and then combined together by a publicly-known technique such as bonding and pressure bonding. Alternatively, a metal layer may be formed by evaporation or the like on a resin member having a pre-corrugated surface.

The metal layer 31 has a corrugated shape including mountain portions and valley portions. Each crest portion of the mountain portions (or valley portions) will be referred to as a wave crest portion 35.

The wave height of the wave portions is desirably 0.2 mm to 0.6 mm, especially desirably 0.3 mm to 0.5 mm. When the wave height is excessively low, the effect produced by forming the cross section in the corrugated shape is small. On the other hand, when the wave height is excessively high, a change in thickness becomes significant to deteriorate durability and, furthermore, deformation of waves occurs during production.

The wave pitch of the wave portions is desirably 1.5 mm to 4 mm. When the wave pitch is excessively narrow, distortion is concentrated locally during processing of wave portions to decrease processability. On the other hand, when the wave pitch is excessively wide, the processing into the corrugated shape is facilitated because the spaces between the wave portions are large, but the durability improving effect is small because the effect of absorbing distortion by the wave portions is small.

FIG. 3(a) is a perspective view of the resin coating portion. The dotted line in FIG. 3(a) indicates the corrugated shape and the wave crest portions 35. The wave crest portions 35 are formed continuously and substantially perpendicularly to the longitudinal direction of the multilayer tape 30. In the present invention, the direction of the wave crest portions 35 (wave portions) does not have to be substantially perpendicular to the longitudinal direction of the multilayer tape 30 as illustrated, and the wave crest portions 35 may be formed at a predetermined angle. It is apparent, however, that the effect of absorbing distortion by the wave portions is larger when the direction of the wave crest portions 35 is substantially perpendicular to the longitudinal direction of the multilayer tape 30.

Figure 4:
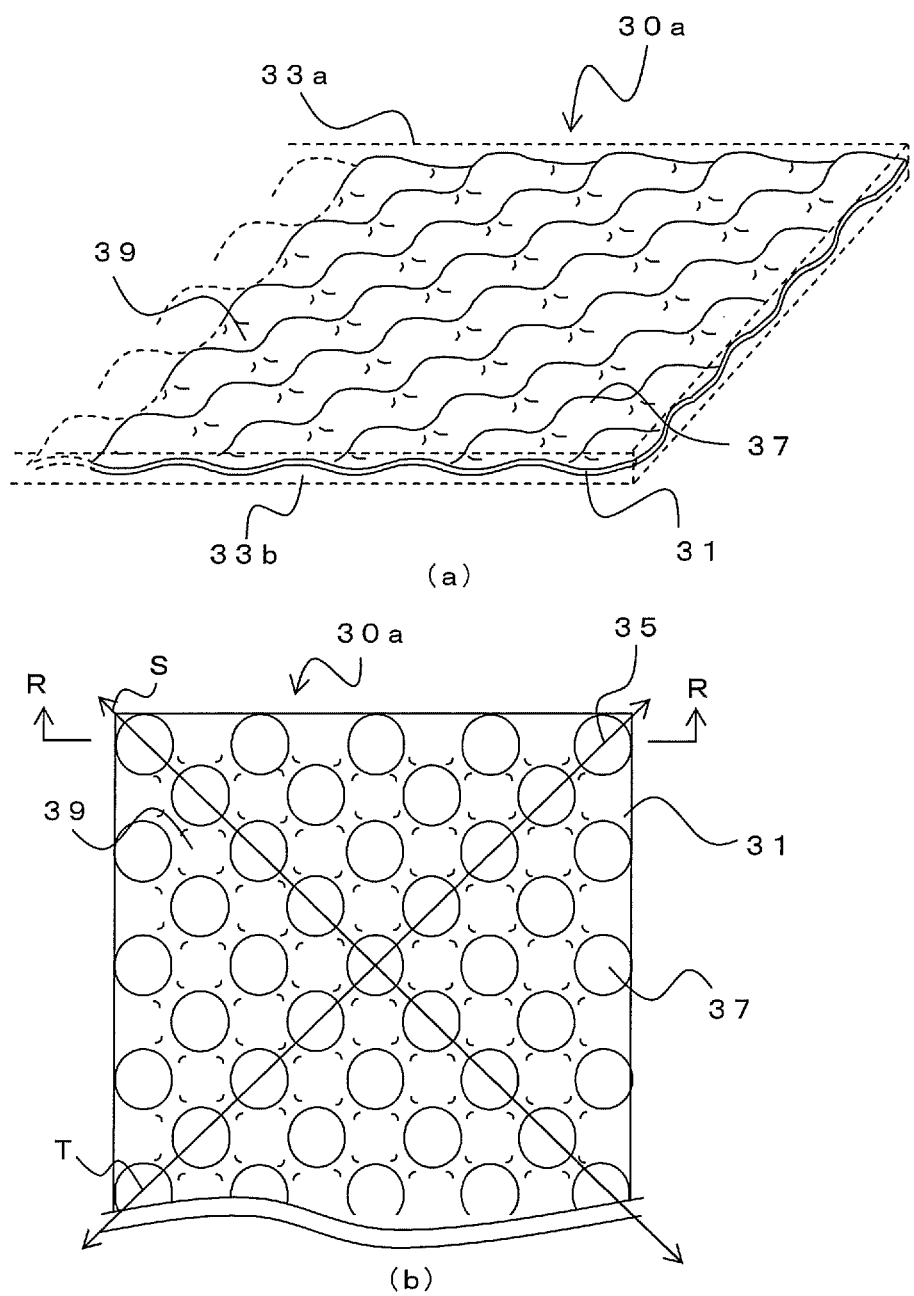
FIG. 4 Perspective views of a resin coating layer of a multilayer tape 30*a*.

In the present invention, a multilayer tape 30a illustrated in FIG. 4 can also be used. FIG. 4(a) is a perspective view of the multilayer tape 30a (perspective view of resin coating portion 33a), and FIG. 4(b) is a plan conceptual view of the metal layer 31. The structure of the multilayer tape 30a is substantially the same as that of the multilayer tape 30, except that the shape of convex-concave shape of the metal layer is different.

As illustrated in FIG. 4(b), the corrugated shape of the multilayer tape 30a is formed in at least two different directions (directions S and T in FIG. 4(b)). Accordingly, mountain portions 37 and valley portions 39 (wave crest portion) are formed in a lattice arrangement. As used herein, the phrase "a corrugated shape is formed at least in two directions" means that direct lines connecting nearest wave crest portions together in a planar view are formed at least in two directions. Further, the two different directions do not necessarily have to be perpendicular to each other.

The cross sectional view along the line R-R that is illustrated in FIG. 4(b) is similar to that illustrated in FIG. 3(b). In other words, the corrugated shape in the cross section of the multilayer tape 30a is, for example, a corrugated shape in which a convex-concave shape is repeated smoothly and continuously in a curved line, as illustrated in FIG. 3(b). Further, the height and the pitch of the convex-concave shape are the same as those of the multilayer tape 30 described above.

Figure 5:
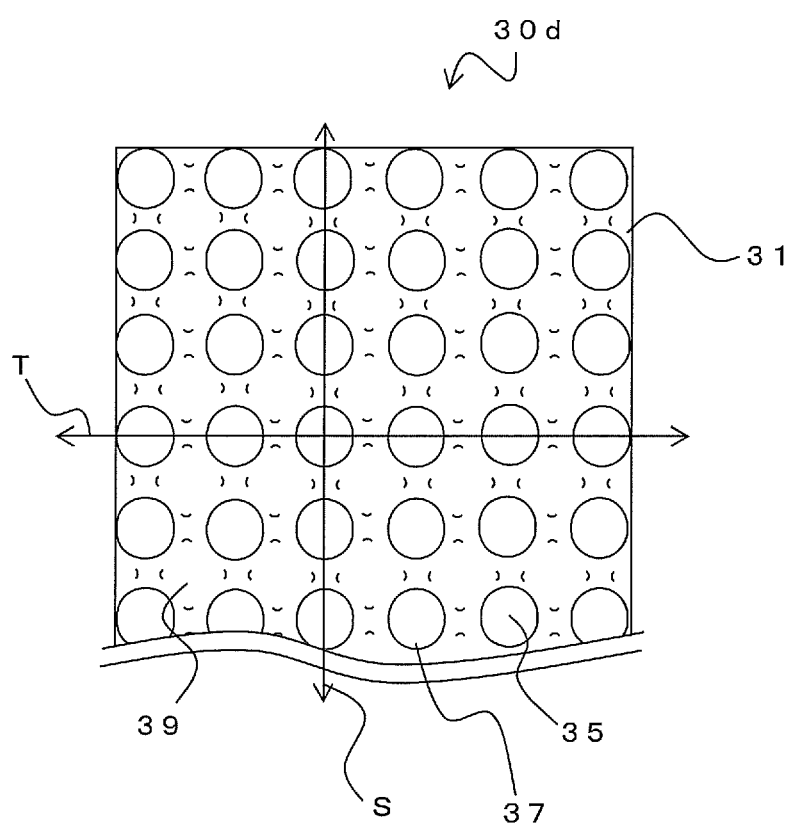
FIG. 5 A perspective plan view of a resin coating layer showing an embodiment of a multilayer tape 30*d*.

As to a method of coating the metal film of the multilayer tape 30a with the resin, an embossed metal film as illustrated in FIG. 5 may be extrusion coated with the resin. Alternatively, a metal layer may be formed by evaporation on a resin member having a surface that is embossed in advance to have the convex-concave shape.

Desirably, the waves formed in two different directions are formed at substantially the same pitch.

Examples of a corrugated shape formed in two different directions are not limited to that illustrated in FIG. 4. As in the multilayer tape 30d illustrated in FIG. 5, the corrugated shape may be formed such that the direction in which the corrugated shape is formed is in the longitudinal direction and the width direction.

As described above, the directions in which the corrugated shape of the multilayer tape is formed in two different directions may be any directions to obtain the same effect. In general, however, a metal tape constituting the metal layer 31 has different mechanical properties in the longitudinal direction and the width direction. Thus, if the corrugated shape is formed in different directions with respect to the longitudinal direction of the metal tape, fatigue characteristics and the like of the corrugated shape may differ in each direction.

Thus, in order to form the corrugated shape with uniform characteristics in every direction, it is desirable to, for example, form the corrugated shape towards the right and the left at the same angle (for example, ±45°) centered with respect to the longitudinal direction of the multilayer tape 30a (metal tape constituting the metal layer 31) in a planar view, as illustrated in FIG. 5.

The effect obtained by use of the multilayer tape 30 can also be obtained by use of the multilayer tape 30a or 30d. Especially, since the corrugated shape of the metal layer 31 is formed in two different directions, it becomes possible to follow deformation in any direction and, furthermore, excellent productivity of the multilayer tape can also be realized.

The corrugated shape of the metal layer 31 is not limited to the above-described exemplary corrugated shape formed with a continuous curved line such as a sine wave. For example, as in the multilayer tape 30b illustrated in FIG. 6(a), the corrugated shape in the cross section may be a trapezoidal square wave. Alternatively, as in the multilayer tape 30c illustrated in FIG. 6(b), the corrugated shape may be a triangular wave.

Figure 6:
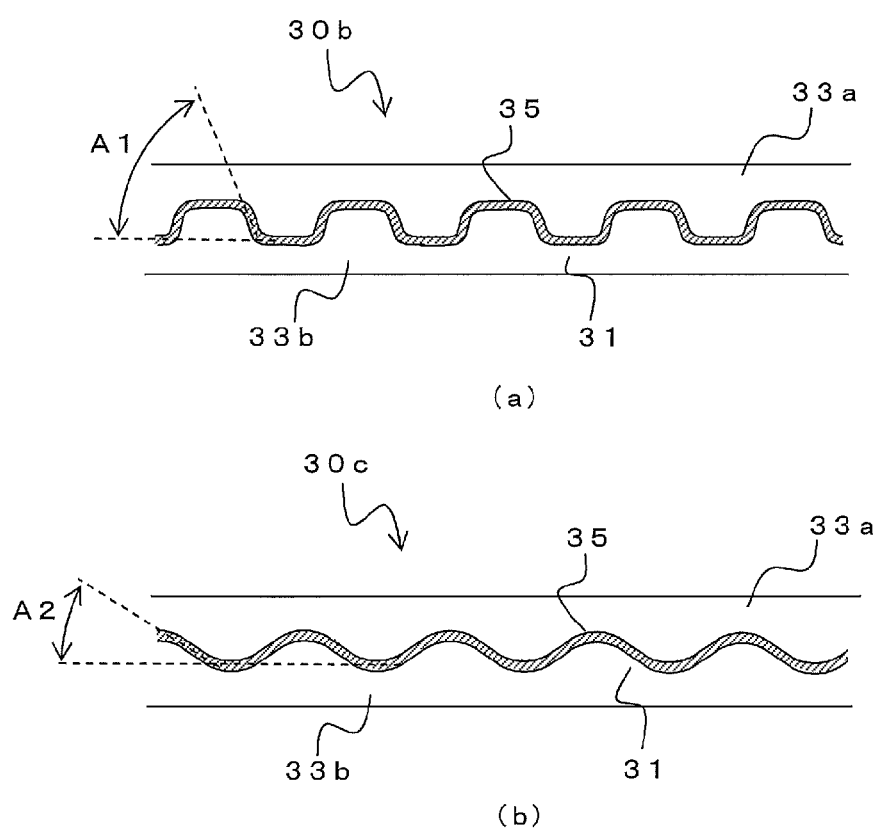
FIG. 6 Figures illustrating embodiments of multilayer tapes 30*b* and 30*c*.

In the case in which the corrugated shape is the trapezoidal square wave or the triangular wave as illustrated in FIG. 6(a) or 6(b), it is desirable to form the corrugated shape such that portions near the wave crest portions or the wave base portions are formed with a smoothly curved line as described, in order to prevent concentration of stress on joint portions of the convex-concave shape. This enables processing of the trapezoidal square wave or the triangular wave. The length of the smoothly curved line, the length of the straight line portion, and the rising angle (angles A1 and A2 in FIG. 6) of the straight line portion from a flat sheet surface can be set as appropriate to satisfy a predetermined pitch in combination. For example, it is desirable to set the rising angle in the range of 30° to 80° in the case of the trapezoidal square wave, or in the range of 10° to 45° in the case of the triangular wave.

The multilayer tapes 30b and 30c can produce a similar effect to those produced by the multilayer tapes 30, 30a, and 30d. The corrugated shape is not limited to the embodiments, and any corrugated shape in a flexible form may be used.

The following describes a method of winding the multilayer tape 30. It is to be noted that while the following describes an example using the multilayer tape 30, it is apparent that the method is also applicable to the multilayer tapes 30a, 30b, 30c, and 30d.

Figure 7:
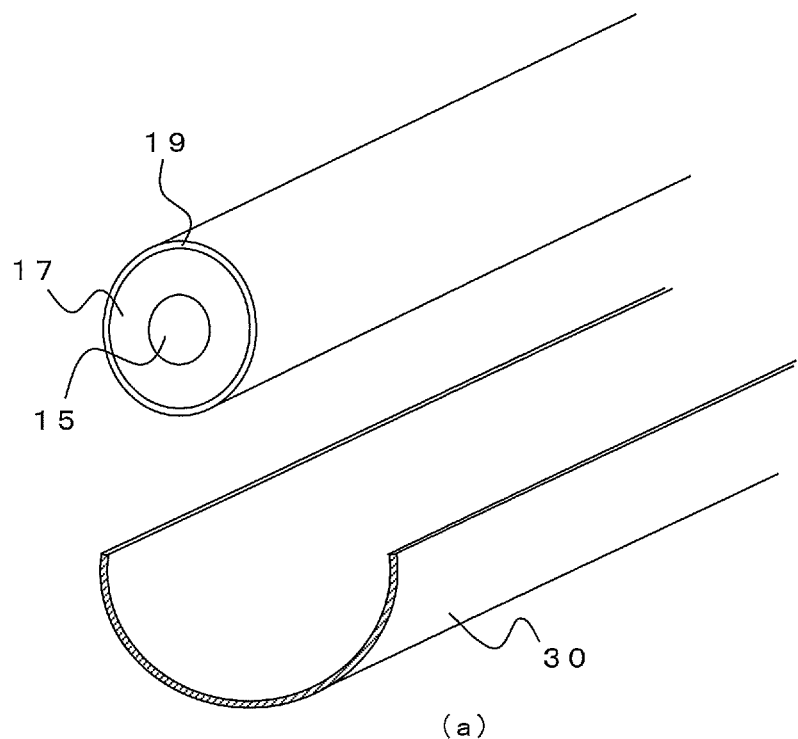
FIG. 7 Figures illustrating a winding state in which the multilayer tape 30 is wound longitudinally.
Figure 7:
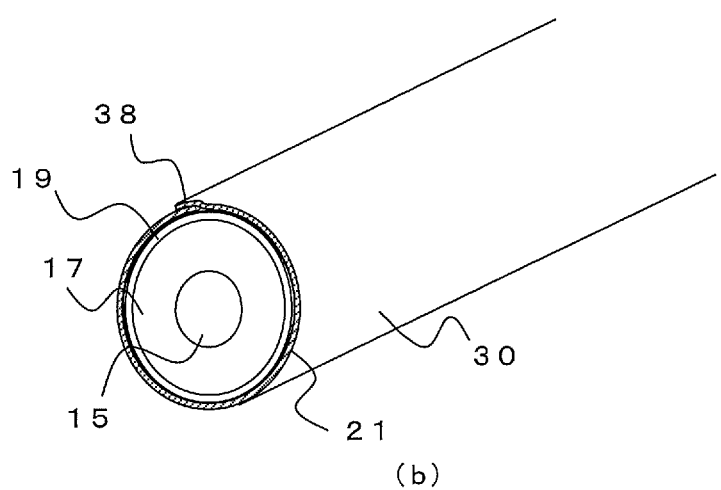

FIG. 7 illustrates a forming step in which the multilayer tape 30 is wound longitudinally around the power line core 13 including the shield layer 19. The insulating member 17 is formed in advance on the outer periphery of the conducting member 15, and the shield layer 19 is formed on the outer periphery of the insulating member 17. The multilayer tape 30 is wound around the outer periphery of the shield layer 19.

Desirably, the multilayer tape 30 is wound longitudinally as illustrated in FIG. 7 (a). In this case, the multilayer tape 30 is sent to the power line core 13 such that the longitudinal direction of the multilayer tape 30 is substantially the same as the axial direction of the power line core 13. At this time, both sides of the multilayer tape 30 are bent into the U-shape so as to surround the entire power line core 13 (shield layer 19).

Then, the multilayer tape 30 surrounds the power line core 13 (shield layer 19). Specifically, as illustrated in FIG. 7(b), both side edge portions of the multilayer tape 30 are overlapped with each other on the outer periphery portion of the shield layer 19 so that the multilayer tape 30 surrounds the shield layer 19. In other words, an overlapping portion 38 is formed along the axial direction of the power line core 13. By this way, the multilayer tape 30 is wound longitudinally around the power line core 13 (shield layer 19) to thereby form the water shielding layer 21.

As described above, the multilayer tape 30 is wound such that the longitudinal direction of the multilayer tape 30 is substantially the same as the axial direction of the power line core 13 and the width direction of the multilayer tape 30 is substantially the same as the circumferential direction of the power line core 13, and then leading edges of the wound portion that is wound in the circumferential direction are overlapped with each other, whereby the overlapping length of the multilayer tape 30 can be reduced with respect to the total length of the power line core 13.

That is to say, although a little space is formed between the metal layers 31 at the overlapping portion 38, if the length of the overlapping portion is reduced, the space between the metal layers 31 can be reduced with respect to the total length of the power line core 13. Further, the multilayer tape 30 is attached and wound longitudinally so that the overlapping portion 38 is formed straight in the axial direction of the power line core 13. This facilitates fusion of the overlapping portion and, furthermore, realizes excellent productivity.

The outer periphery of the water shielding layer 21 thus formed is coated with the anticorrosion layer 22 by extrusion coating. As a result, the power line core 13 is formed.

Figure 8:
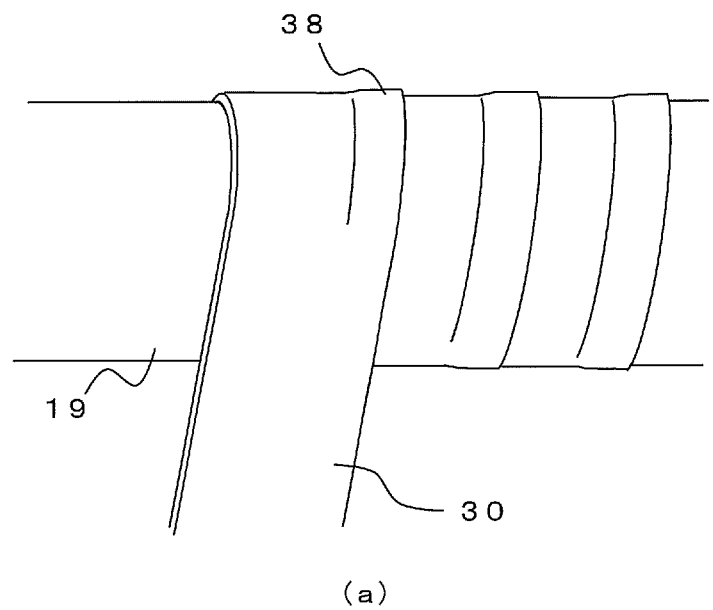
FIG. 8 Figures illustrating a winding state in which the multilayer tape 30 is wound helically.
Figure 8:
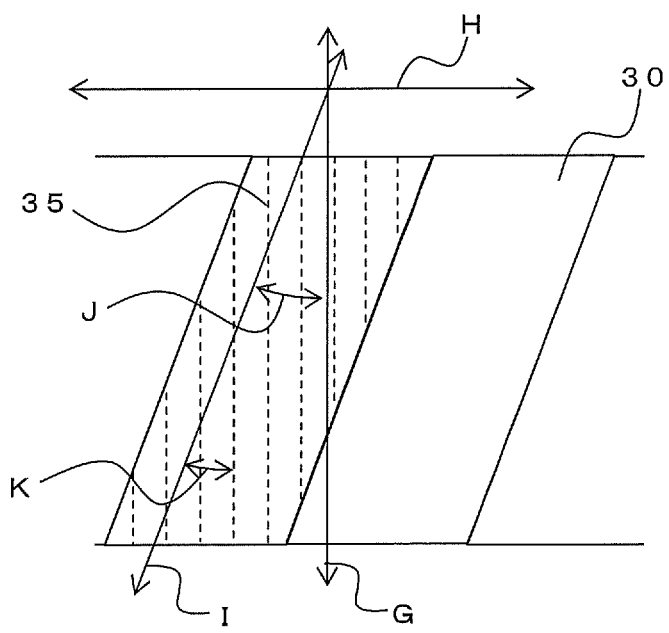

The method of winding the multilayer tape 30 is not limited to the above-described method in which the multilayer tape 30 is attached and wound longitudinally. For example, the multilayer tape 30 may be wound helically as illustrated in FIG. 8(a). In the example illustrated in FIG. 8, the multilayer tape 30 is wound such that, for example, edge portions of the multilayer tape 30 in the width direction are overlapped with each other at the overlapping portions 38.

Alternatively, the multilayer tape 30 may be wound by gap winding such that the multilayer tape 30 is wound to leave a little space so that the edge portions of the multilayer tape 30 in the width direction do not overlap each other. In this case, to cover the space in the multilayer tape 30 as a lower layer (inner layer), the multilayer tape 30 as an upper layer (outer layer) may be wound around the outer periphery of the lower layer by a similar method such that the winding position of the upper layer is shifted from that of the lower layer. In this case, the upper layer of the multilayer tape and the lower layer of the multilayer tape are wound in the same direction. In the case of the gap winding, if it is desired to increase the tape thickness, it is desirable to wind two-ply multilayer tape.

FIG. 8(b) is a pattern diagram illustrating a state in which the multilayer tape 30 is wound helically (it is to be noted that illustration of the overlapping portion 38 is omitted for simplification). In the present embodiment, the corrugated wave crest portions 35 are formed in one direction. The direction in which the wave crest portions 35 are formed is the direction in which the wave crest portions 35 extend continuously. With respect to this direction, the metal layer 31 is not corrugated in the cross section. At this time, the direction in which the corrugated shape is formed (direction that is perpendicular to the direction in which the wave crest portions 35 are formed) is desirably arranged to be in the axial direction of the power line core, because when bending force is applied to the power line core, expansion and contraction of the surface of the cable core for electric power in the axial direction can easily be followed.

For example, as illustrated in FIG. 8(b), in the front view (or plan view) of the power line core, when the multilayer tape 30 is helically wound around the outer periphery of the shield layer, the axial direction H of the power line core is perpendicular to the circumferential direction G of the power line core. The angle between the winding direction I of the multilayer tape 30 and the circumferential direction G of the power line core is referred to as an angle J. The winding direction I of the multilayer tape 30 is the same as the longitudinal direction of the multilayer tape 30.

At this time, the angle of the direction in which the wave crest portions 35 are formed with respect to the longitudinal direction I of the multilayer tape 30 is referred to as an angle K. In this case, a difference between the angle J, which is the angle between the winding direction I of the multilayer tape 30 and the circumferential direction G of the power line core, and the angle K, which is the angle between the direction in which the wave crest portions 35 are formed and the longitudinal direction I of the multilayer tape, is desirably small (FIG. 8(b) illustrates an example in which the angles J and K are substantially the same).

In this way, the direction in which the corrugated shape is formed can be made close to the axial direction of the power line core. Specifically, the winding angle of the multilayer tape 30 is set in advance, and then the multilayer tape 30 that has repeated wave crest portions tilted at an angle corresponding to the winding angle in the plan view is used, whereby the direction in which the convex and concave portions of the corrugated shape are formed can be made close to the axial direction of the power line core (undersea cable). If the axial direction of the undersea cable is shifted from the direction in which the convex and concave portions of the corrugated shape, the pitch of the corrugated shape viewed from the axial direction of the undersea cable can be increased. Desirably, the angle J formed between the winding direction I of the multilayer tape 30 and the circumferential direction G of the power line core is 80° or larger and smaller than 90'.

Figure 9:
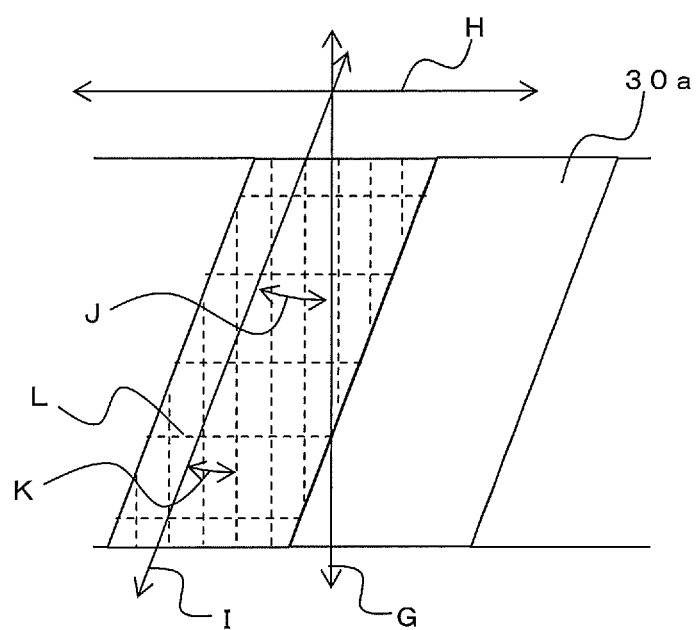
FIG. 9 A front pattern diagram illustrating a winding state in which the multilayer tape 30*a* is wound helically.

In the case of the multilayer tape 30a having the corrugated shape in two different directions as illustrated in FIG. 9, the angle formed between the longitudinal direction I and an orthogonal direction of the corrugated shape (orthogonal direction of one of the corrugated shapes formed in two different directions) is referred to as an angle K. For example, the angle K is about 45° in FIG. 4(b). In this case, a difference between the angle J, which is formed between the winding direction I of the multilayer tape 30a and the circumferential direction G of the power line core, and the orthogonal angle K of the corrugated shape with respect to the longitudinal direction I of the multilayer tape 30a is desirably small (it is to be noted that FIG. 9 illustrates the example in which the angles J and K are substantially the same).

Accordingly, even in the case of the multilayer tape 30a having the corrugated shape in two different directions, the direction in which the corrugated shape is formed (direction L in FIG. 9) can be made close to the axial direction of the power line core. Thus, the wave pitch with respect to the axial direction of the power line core 13 (pitch of the corrugated shape that appears in the cross section in the axial direction) can be made smaller than the wave pitch with respect to the circumferential direction of the power line core 13 (pitch of the corrugated shape that appears in the cross section in the circumferential direction).

In other words, the wave pitch with respect to the axial direction of the power line core 13 (pitch of the corrugated shape that appears in the cross section in the axial direction) is desirably the same as or smaller than the wave pitch with respect to the circumferential direction of the power line core 13 (pitch of the corrugated shape that appears in the cross section in the circumferential direction). This makes it possible to deform the corrugated shape more efficiently to follow the deformation of the power line core 13.

The melting point of the resin coating portion 33a (the resin portion that is positioned on the outer periphery side and is in contact with the anticorrosion layer 22 when the multilayer tape is wound) constituting the water shielding layer 21 may be lower than that of the resin constituting the anticorrosion layer 22. Further, the resin constituting the resin coating portion 33a and the resin constituting the anticorrosion layer 22 may be compatible with each other. If the resin coating portion 33a and the anticorrosion layer 22 are compatible with each other and if the melting point of the resin coating portion 33a is lower than the melting point of the anticorrosion layer 22, when the resin of the anticorrosion layer 22 is extruded, the anticorrosion layer 22 and the multilayer tape 30 and the like are easily combined together. Thus, when the anticorrosion layer 22 is formed, the water shielding layer 21 and the anticorrosion layer 22 are not likely to be deviated from each other or the like.

As to materials that satisfy the above relationship, for example, the resin coating portion 33a may be made of nylon 12, and the anticorrosion layer 22 may be made of nylon 11. Alternatively, the resin coating portion may be made of low-density polyethylene (LDPE), and the anticorrosion layer 22 may be made of high-density polyethylene (HDPE).

The (surface of the) resin coating portion 33a may be made of a rubber material (for example, ethylene rubber, ethylenepropylene rubber, silicon rubber, urethane rubber, butyl rubber, etc.). This makes it possible to increase the coefficient of friction between the anticorrosion layer 22 and the resin coating portion 33a (multilayer tape 30). Thus, the anticorrosion layer 22 and the multilayer tape 30 and the like are closely attached to one another and not likely to deviate from one another.

When the resin coating portion 33a is entirely made of a rubber material, the adhesive quality with respect to the metal layer 31 may become inferior. Thus, the resin coating portion 33a may be formed as a multilayer. Specifically, the resin coating portion 33a may be formed to include an inner layer and an outer layer, and a resin layer that is excellent in adhesive quality with respect to the metal layer 31 may be provided in the inner layer while only the outer layer is made of a rubber material.

Further, an adhesive layer may also be formed on the outer periphery of the resin coating portion 33a. Forming the adhesive layer makes it possible to bond the resin coating portion 33a and the anticorrosion layer 22 together. Thus, the anticorrosion layer 22 and the multilayer tape 30 and the like are bonded together and not likely to deviate from each other.

The resin coating portion 33b (the resin portion that is positioned on the inner periphery side and in contact with the shield layer 19 when the multilayer tape is wound) constituting the water shielding layer 21 may be made of a conductive resin. Examples of a conductive resin that can be used include a mixture prepared by adding a conductive filler or the like to a resin such as EEA (ethylene-ethyl acrylate copolymer), PVC (polyvinyl chloride), and EVA (ethylene-vinyl acetate copolymer). Examples of a conductive filler that can be used include carbon.

The foregoing makes it possible to electrically connect the inner shield layer 19 and the resin coating portion 33b together. As described above, the shield layer 19 is connected to the ground at the end portions of the undersea cable 3. Meanwhile, when the metal layer 31 sticks out from the cross section of the power line core 13, the metal layer 31 may be charged. However, if the resin coating portion 33b on the inner surface side is made of a conductive resin, the metal layer 31 can electrically be connected to the shield layer 19. Thus, the metal layer 31 can be connected to the ground.

Figure 10:
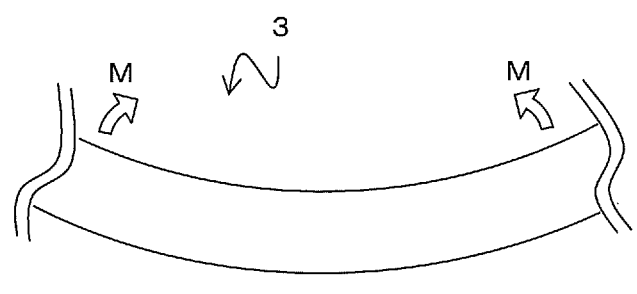
FIG. 10 Figures illustrating a deformation state of the multilayer tape 30.
Figure 10:
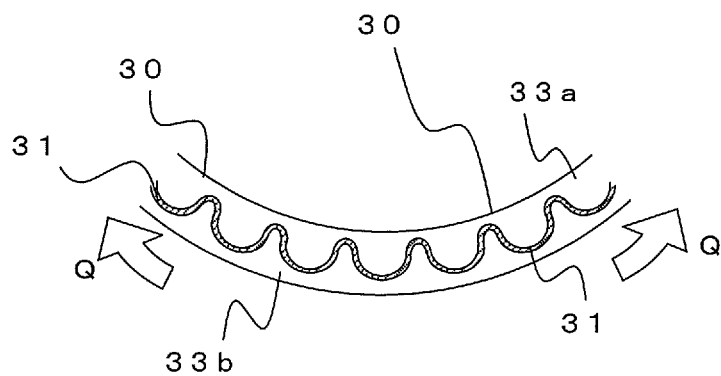

FIG. 10 illustrates a state in which the undersea cable 3 is deformed. As illustrated in FIG. 10(a), when the undersea cable 3 is bent and deformed (direction of arrow M in FIG. 10(a)), the power line core 13 inside the undersea cable 3 is also bent in the same direction. At this time, the bent outer periphery side of the power line core 13 is tensile deformed.

FIG. 10(b) is a pattern diagram illustrating a state of the multilayer tape 30 at a tensile deformed portion of the power line core 13. When the power line core 13 is bent and deformed to cause local tensile deformation, the multilayer tape 30 that is wound around the tensile deformed portion is also tensile deformed to follow the bending of the power line core 13 (direction of arrow Q in FIG. 10(b)). At this time, the resin coating portions 33a and 33b can easily follow the deformation due to the elastic deformation capability of the resin.

Meanwhile, since the metal layer 31 has the corrugated shape, the metal layer 31 can easily follow the deformation by expansion and contraction of waves. Especially, the corrugated shape is formed repeatedly in the axial direction of the power line core 13 so that the deformation direction of expansion and contraction by the corrugated shape corresponds to the axial direction of the power line core 13. This enables the multilayer tape 30 (water shielding layer 21) to easily follow the bending deformation of the power line core 13. In other words, the winding of the multilayer tape 30 including the metal layer 31 does not negatively affect the flexibility (deformation) of the power line core 13. Thus, the power line core 13 can follow bending deformation of the undersea cable 3.

Further, since the metal layer 31 being wound has the corrugated shape, the metal layer 31 can also expand and contract in the radial direction of the cable. For example, even when the power line core 13 expands in the radial direction to cause tension in the circumferential direction, the multilayer tape 30 can follow this deformation. Thus, the power line core 13 can also follow expansion and contraction in the radial direction that are associated with a change in temperature of the undersea cable 3 and the like. Furthermore, the power line core 13 is moved by waves and ocean currents and receives twisting deformation. In this case, use of the cable according to the present embodiment makes it possible to follow distortion in both the axial direction and the circumferential direction.

Figure 11:
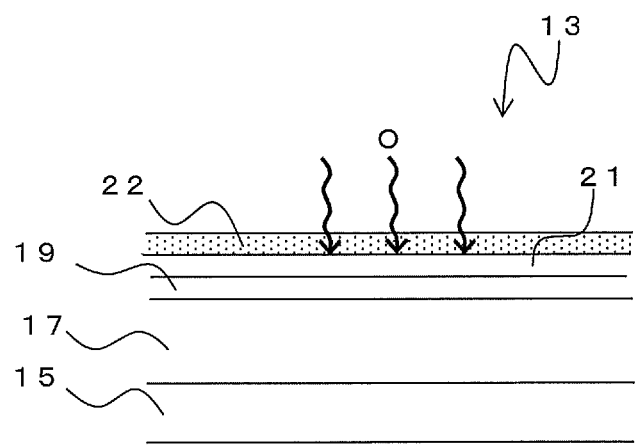
FIG. 11 Figures illustrating an effect of a water shielding layer 21.
Figure 11:
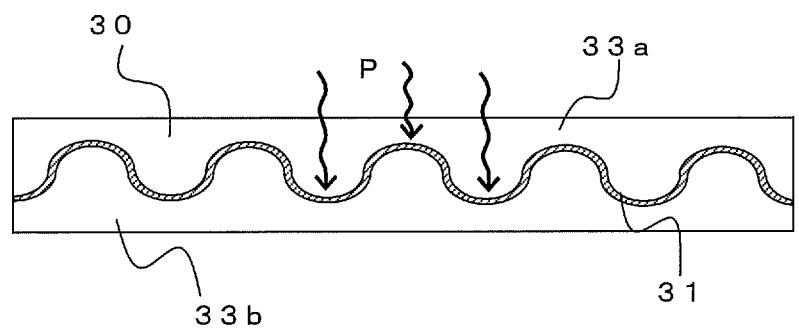

The following describes the function of the water shielding layer 21. FIG. 11 illustrates a cross section of the power line core 13. FIG. 11(a) is a cross sectional view in the axial direction, and FIG. 11(b) is an enlarged view of the multilayer tape 30 constituting the water shielding layer 21. As described above, the undersea cable 3 is normally, for example, submerged under the sea or floated and used.

Since the outer anticorrosion layer 25 and the anticorrosion layer 22 are made of resin, the outer anticorrosion layer 25 and the anticorrosion layer 22 have some water resistance. However, the resin has slight water absorption. Thus, seawater components slightly penetrate into the anticorrosion layer 22. Especially at the bottom of the sea, high water pressure is applied. Thus, when the cable is used for a long period of time, penetration of seawater components into the anticorrosion layer 22 is highly likely to occur (direction of arrow O in FIG. 11).

However, the power line core 13 according to the present embodiment includes the shielding layer 21 on the inner periphery surface of the anticorrosion layer 22. Thus, as illustrated in FIG. 11(b), the metal layer 31 in the water shielding layer 21 reliably blocks penetration of water from the outside (direction of arrow P in FIG. 11(b)). Thus, no breakdown due to penetration of water into the insulating member 17 is likely to occur.

As described above, the water shielding layer 21 is provided on the outer periphery of the shield layer 19 so that no breakdown due to penetration of water from the outside is likely to occur. Further, the water shielding layer 21 includes the multilayer tape 30, in which the metal layer 31 is sandwiched by the resin coating portions 33a and 33b, and the like so that the metal layer 31 can reliably block the flow of water from the outside in the radial direction of the tubular body (direction towards the center of the tubular body).

Further, since the metal layer 31 is sandwiched by the resin coating portions 33a and 33b, the metal layer 31 is not likely to be damaged or bent while the water shielding layer 21 is formed. Thus, the water shielding layer 21 can reliably be formed. Furthermore, since the metal layer 31 does not come into direct contact with the shield layer 19, the metal layer 31 is not likely to damage the layers during the production.

Further, since the cross sectional shape of the metal layer 31 of the multilayer tape 30 is the corrugated shape, the multilayer tape 30 (metal layer 31) being wound can easily be deformed by expansion and contraction in the direction of the corrugated shape. Further, the metal layer 31 is corrugated so that when the undersea cable 3 (power line core 13) is bent, local concentration of stress on the metal layer 31 can be reduced. Thus, long-term repeat flexural fatigue characteristics can be improved to obtain a flexible tube that is excellent in long-term reliability.

Especially, the direction in which the wave crest portions 35 of the multilayer tape 30 being wound extend can be arranged to be substantially the same as the circumferential direction of the power line core 13. Thus, the multilayer tape 30 (metal layer 31) can easily follow the deformation direction when the multilayer tape 30 is bent, whereby high flexibility can be obtained.

In the present invention, the direction in which the wave crest portions 35 of the multilayer tape 30 being wound are formed does not necessarily have to be substantially the same as the circumferential direction of the power line core 13, but desirably, the wave pitch with respect to the axial direction of the power line core 13 (pitch of the corrugated shape that appears in the cross section in the axial direction) is smaller than the wave pitch with respect to the circumferential direction of the power line core 13 (pitch of the corrugated shape that appears in the cross section in the circumferential direction). In other words, it is desirable to arrange as many waves as possible with respect to the axial direction of the power line core 13. This is effective for tension of the surface of the power line core 13.

It is to be noted that when the water shielding layer 24 is formed on the inner periphery side of the outer anticorrosion layer 25, the multilayer tape 30 can also be used to form the water shielding layer 24. In this case, the resin portion on the outer periphery side of the multilayer tape constituting the water shielding layer 24 is desirably compatible with the outer anticorrosion layer 25 and the like, and the melting point of the resin portion is desirably lower than the melting point of the resin constituting the outer anticorrosion layer 25.

EXAMPLES

Evaluation of flexural characteristics, bending fatigue durability and the like of the multilayer tape was conducted on the wave form (pitch and height) of the metal layer of the multilayer tape in which the wave crest portions of the metal layer were formed in one direction and in two directions and mountain portions or valley portions of the corrugated shape were formed in the direction that was perpendicular to the direction in which the wave crest portions were formed. As to the convex-concave shape of the multilayer tape, the multilayer tapes having a corrugated shape, the multilayer tapes having a trapezoidal square wave, and the multilayer tapes having a triangular wave were prepared. The multilayer tapes having the corrugated shape of a sine wave, the multilayer tapes having the trapezoidal square wave with a rising angle (angle A1 in FIG. 6(a)) of 60°, and the multilayer tapes having the triangular wave with a rising angle (angle A2 in FIG. 6(b)) of 25° were used; the sides were connected together with a smoothly curved line.

Figure 12:
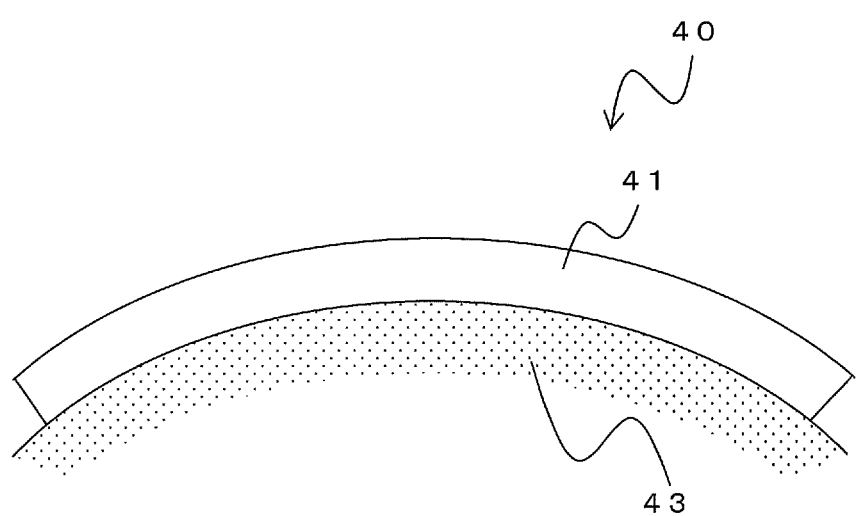
FIG. 12 A figure illustrating a flexural characteristics evaluation apparatus 40.

The evaluation of flexural characteristics was conducted by use of a flexural characteristics evaluation apparatus 40 illustrated in FIG. 12. The flexural characteristics evaluation apparatus 40 included a bending plate 43 having an upper surface with a predetermined curvature. The curvature of the upper surface of the bending plate 43 was set to 120 mmR. A specimen 41 was pressed against the surface along the curvature of the bending plate 43 so that the specimen 41 was deformed. A multilayer tape (having the corrugated shape illustrated in FIG. 3 or 4) was attached and wound longitudinally (winding method illustrated in FIG. 7) around an outer periphery of a cable having a diameter of 15 mm, and the resulting product was used as the specimen 41. When the specimen 41 was bent, an outer surface of the multilayer tape was visually observed to determine whether a wrinkle or crack was formed.

Figure 13:
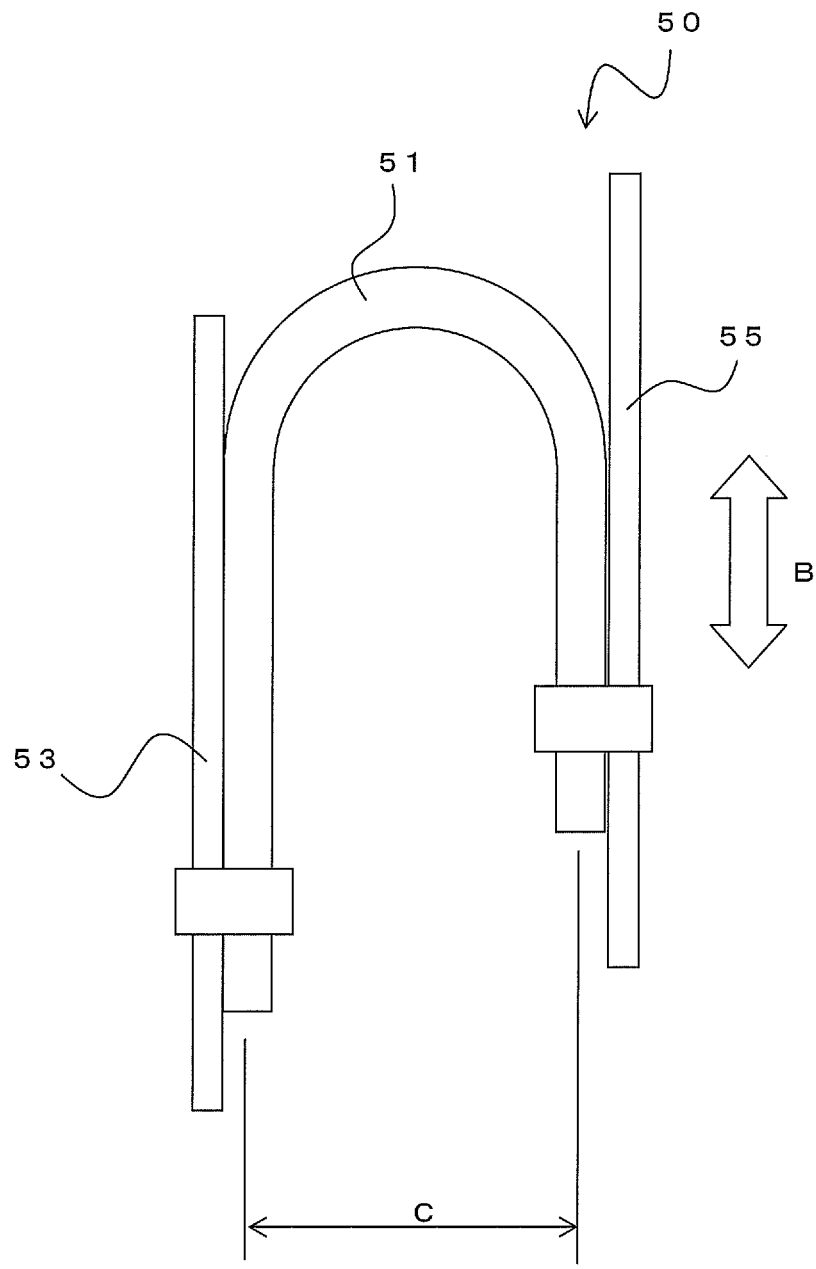
FIG. 13 A figure illustrating a flexural fatigue characteristics evaluation apparatus 50.

The evaluation of flexural fatigue characteristics was conducted by use of a flexural fatigue characteristics evaluation apparatus 50 illustrated in FIG. 13. The flexural fatigue characteristics evaluation apparatus 50 included a fixed member 53, a movable member 55 and the like. The fixed member 53 and the movable member 55 were disposed parallel to each other at a predetermined distance C from each other. Edge portions of a specimen 51 were fixed to the fixed member 53 and the movable member 55 in opposite directions. In other words, the central portion of the specimen 51 was bent at 180°.

While the fixed member 53 was being fixed, the movable member 55 was reciprocated in the axial direction (direction of arrow B in FIG. 13). As a result, repeat bending deformation was applied to the specimen 51. The distance C between the fixed member 53 and the movable member 55 (i.e., two times the bending radius of the specimen 51) was adjusted such that the bending distortion at the time of repeat bending was 2%.

The multilayer tapes in which the wave crest portions of the corrugated shape of the metal layer with a width of 10 mm were formed in one or two directions were used as the specimen 51. The multilayer tapes were formed such that the thickness of the metal tape was 0.05 mm and the wave height of the metal tape was 0.2 mm to 0.8 mm. Repeat bending tests were conducted by use of the above apparatuses such that the amount of distortion was 2% at the time of repeat bending, and the number of times the bending was repeated until the multilayer tape was broken was counted.

The results of the above evaluation are shown in Tables 1 and 2.

TABLE 1

| | No. | | | | | | | | | |
|---|---|---|---|---|---|---|---|---|---|---|
| | 1 | 2 | 3 | 4 | 5 | 6 | 7 | 8 | 9 | 10 |
| Thickness of metal layer (mm) | 0.05 | 0.05 | 0.05 | 0.05 | 0.05 | 0.05 | 0.05 | 0.05 | 0.05 | 0.05 |
| Convex-concave shape | None | Corrugated | Corrugated | Corrugated | Corrugated | Trapezoidal | Triangular | Corrugated | Corrugated | Corrugated |
| Wave height (mm) | 0 | 0.2 | 0.3 | 0.5 | 0.6 | 0.6 | 0.6 | 0.8 | 0.5 | 0.6 |
| Wave pitch (mm) | None | 3 | 3 | 3 | 3 | 3 | 3 | 3 | 1.5 | 4 |
| Flexural characteristics | Poor | Good | Good | Good | Good | Good | Good | Good | Good | Good |
| Flexural fatigue characteristics | Poor | Average | Good | Good | Good | Good | Good | Average | Good | Average |
| Productivity of multilayer tape | Good | Good | Good | Good | Good | Good | Good | Average | Good | Good |
| Overall evaluation | Poor | Average | Good | Good | Good | Good | Good | Average | Good | Average |

TABLE 2

| | No. | | | | | | | | | | |
|---|---|---|---|---|---|---|---|---|---|---|---|
| | 11 | 12 | 13 | 14 | 15 | 16 | 17 | 18 | 19 | 20 | 21 | 22 |
| Thickness of metal layer (mm) | 0.05 | 0.05 | 0.05 | 0.05 | 0.05 | 0.05 | 0.05 | 0.05 | 0.05 | 0.05 | 0.05 | 0.05 |

TABLE 2-continued

| | No. | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Convex-concave shape | Corrugated | Corrugated | Corrugated | Corrugated | Corrugated | Trapezoidal | Triangular | Corrugated | Trapezoidal | Triangular | Corrugated | Corrugated |
| Wave height (mm) | 0 | 0.2 | 0.3 | 0.5 | 0.6 | 0.6 | 0.6 | 0.8 | 0.7 | 0.7 | 0.5 | 0.6 |
| Wave pitch (mm) | None | 3 | 3 | 3 | 3 | 3 | 3 | 3 | 3 | 3 | 1.5 | 4 |
| Flexural characteristics | Poor | Good | Good | Good | Good | Good | Good | Good | Good | Good | Good | Good |
| Flexural fatigue characteristics | Poor | Good | Excellent | Excellent | Good | Good | Good | Average | Good | Good | Excellent | Average |
| Productivity of multilayer tape | Good | Good | Good | Good | Good | Good | Good | Poor | Poor | Poor | Good | Good |
| Overall evaluation | Poor | Good | Good | Good | Good | Good | Good | Poor | Poor | Poor | Good | Average |

Figure 3:
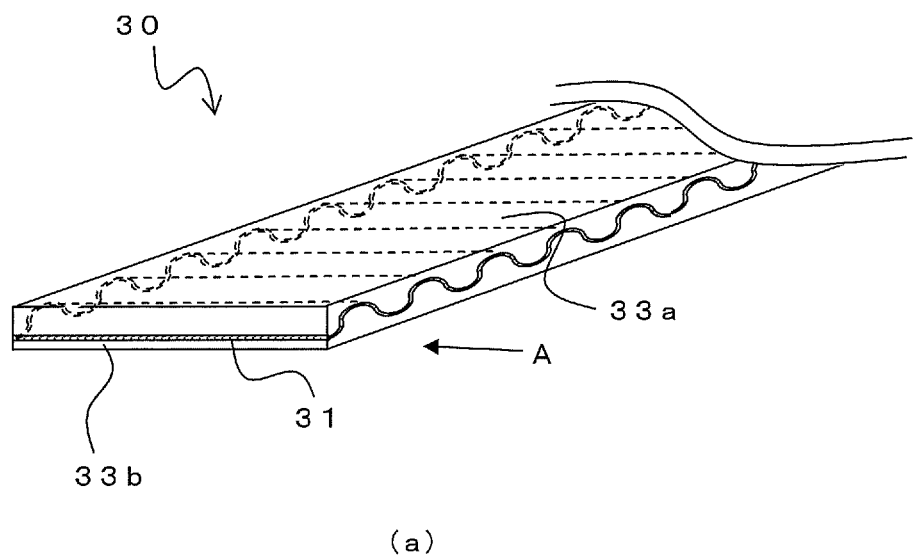
FIG. 3 Figures illustrating the structure of a multilayer tape 30.
Figure 3:
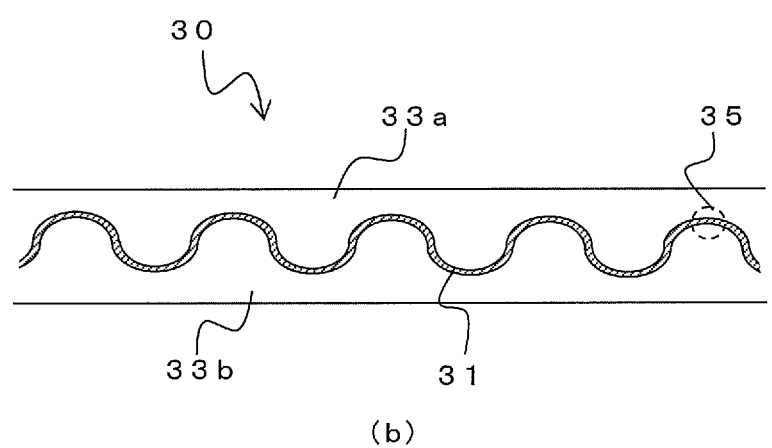

Table 1 shows those in which the wave crest portions were formed in one direction as illustrated in FIG. 3. Table 2 shows those in which the wave crest portions were formed in two directions as illustrated in FIG. 4. The thickness of the metal layer is the thickness of the metal tape constituting the multilayer tape. The wave height is the height of the corrugated shape of the metal layer (height from a valley portion to a mountain portion). The wave pitch is a distance between adjacent wave crest portions.

As to the "convex-concave shape" in Tables 1 and 2, the convex-concave shape repeated in the shape of a curved line in the cross section of the multilayer tape as shown in FIG. 3(b) is specified as "corrugated." The convex-concave shape repeated in the shape of a trapezoidal square wave as shown in FIG. 6(a) is specified as "trapezoidal." The convex-concave shape repeated in the shape of a triangular wave as shown in FIG. 6(b) is specified as "triangle."

The flexural characteristics are results of evaluation conducted by the flexural characteristics evaluation apparatus 40 illustrated in FIG. 12. If a winkle was observed in the surface of the multilayer tape, the multilayer tape was evaluated as "poor." If no wrinkle was observed in the surface of the multilayer tape, the multilayer tape was evaluated as "good."

The bending fatigue durability characteristics are results of evaluation conducted by use of the flexural fatigue characteristics evaluation apparatus 50 illustrated in FIG. 13. If the multilayer tape did not break until the bending was repeated more than $1 \times 10^6$ times at an amount of distortion of 2%, the multilayer tape was evaluated as "excellent." If the multilayer tape broke when the bending was repeated $1 \times 10^5$ to $1 \times 10^6$ times, the multilayer tape was evaluated as "good." If the multilayer tape broke when the bending was repeated $1 \times 10^4$ to $1 \times 10^5$ times, the multilayer tape was evaluated as "average." If the multilayer tape broke when the bending was repeated less than $1 \times 10^4$ times, the multilayer tape was evaluated as "poor."

As to the productivity of a multilayer tape, the multilayer tape was evaluated as "good" if the metal layer of the multilayer tape was not deformed (especially deformation of the wave portions) when the metal layer was laminated with resin, and the multilayer tape was evaluated as "poor" if the metal layer of the multilayer tape was deformed when the metal layer was laminated with resin.

As to the overall evaluation, the lowest evaluation result among the evaluation results in "flexural characteristics," "flexural fatigue characteristics," and "multilayer tape productivity" was used as the overall evaluation result.

In Table 1, the metal layer of the multilayer tape No. 1 did not have the corrugated shape. Thus, wrinkles were observed in the evaluation of flexural characteristics. Furthermore, the multilayer tape No. 1 broke when the bending was repeated less than $1 \times 10^4$ times. On the contrary, as to the multilayer tapes Nos. 2 to 10, no wrinkle was observed in the evaluation of flexural characteristics, and the flexural fatigue characteristics were excellent. Especially, the multilayer tapes Nos. 3 to 7 and 9 had a wave height in the range of 0.3 mm to 0.6 mm and were excellent especially in bending fatigue durability and thus evaluated as "good."

As the multilayer tapes Nos. 6 and 7 indicate, the present invention can produce the same effect regardless of whether the convex-concave shape of the metal tape is corrugated, a square wave, or a triangular wave.

On the other hand, the multilayer tape No. 2 had a low wave height. Thus, the evaluation result of flexural fatigue characteristics was "average." Further, the multilayer tape No. 8 had an excessively high wave height. Thus, wave deformation was observed during the production, and the evaluation result of flexural fatigue characteristics was "average." Further, the multilayer tape No. 10 had a large wave pitch of 4 mm. Thus, the evaluation result of flexural fatigue characteristics was "average." However, although the multilayer tape No. 10 had a wave pitch of 4 mm, it produced a significant effect of improving fatigue characteristics, compared with the multilayer tape No. 1 in which the metal layer does not have the corrugated shape.

Although results are not shown in Table 1, the multilayer tapes having the convex-concave shape (wave height and wave pitch) specified in Nos. 2 to 10 were helically wound (winding method illustrated in FIG. 6 in which the multilayer tape was wound singly with edge portions overlapping with each other) instead of being attached and wound longitudinally, and the same evaluation was conducted. The obtained results were the same as those of the multilayer tapes that were attached and wound longitudinally (results of multilayer tapes Nos. 2 to 10 shown in Table 1).

In Table 2, the metal layer of the multilayer tape No. 11 did not have the corrugated shape. Thus, wrinkles were observed in the evaluation of flexural characteristics, and the multilayer tape broke when the bending was repeated less than $1 \times 10^4$ times. On the contrary, no wrinkle was observed in the multilayer tapes Nos. 12 to 17 and 21 in the evaluation of flexural characteristics, and the flexural fatigue characteristics were excellent. Especially the multilayer tapes Nos. 13, 14, and 21 had a wave height in the range of 0.3 mm to 0.5 mm and were excellent especially in bending fatigue durability and thus evaluated as "excellent." Accordingly, if the corrugated shape (convex-concave shape) is formed toward two directions, higher flexural fatigue characteristics can be obtained.

As the multilayer tapes Nos. 15 to 17 (or Nos. 18 to 20) indicate, the present invention can produce the same effect regardless of whether the convex-concave shape of the metal tape is corrugated, a square wave, or a triangular wave.

On the other hand, the multilayer tapes Nos. 18 to 20 had an excessively high wave height. Thus, wave deformation was observed during the production. Further, the multilayer tape No. 22 had a large wave pitch of 4 mm. Thus, the evaluation result of flexural fatigue characteristics was "average." However, although the multilayer tape No. 22 had a wave pitch of 4 mm, it produced a significant effect of improving fatigue characteristics, compared with the multilayer tape No. 11 in which the metal layer does not have the corrugated shape.

While the foregoing describes the embodiments of the present invention with reference to the accompanying drawings, the scope of the present invention is not limited by the foregoing embodiments. It is obvious that a person skilled in the art can arrive at various changes and modifications within the spirits of the claimed invention, and it should be understood that such changes and modifications definitely belong to the scope of the present invention.

EXPLANATION OF REFERENCE NUMERALS

1 Offshore floating facilities
3 Undersea cable
5a, 5b, 5c Connecting member
7 Submarine cable
9 Buoy
11 Moorings
13 Power line core
15 Conducting member
17 Insulating member
19 Shield layer
21 Water shielding layer
22 Anticorrosion layer
23a, 23b Wire armor
24 Water shielding layer
25 Outer anticorrosion layer
27 Filler layer
29 Optical cable
30, 30a, 30b, 30c Multilayer tape
31 Metal layer
33a, 33b Resin coating portion
35 Wave crest portion
38 Overlapping portion
40 Flexural characteristics evaluation apparatus
41 Specimen
43 Bending plate
50 Flexural fatigue characteristics evaluation apparatus
51 Specimen
53 Fixed member
55 Movable member

The invention claimed is:

1. An undersea cable for offshore floating facilities, comprising at least:
    a power line core in which an insulating layer, a shield layer, a first water shielding layer, and an anticorrosion layer are formed on a conductor;
    a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
    an outer anticorrosion layer formed on an outer periphery side of the wire armor member,
    wherein the first water shielding layer is formed using a multilayer tape in which a metal layer is sandwiched by resins,
    wherein a cross sectional shape of the metal layer of the multilayer tape is a convex-concave shape, and
    wherein the convex-concave shape of the metal layer is formed such that on a plane surface of the multilayer tape, mountain portions or valley portions of the convex-concave shape are alternately and continuously repeated toward two different directions.

2. The undersea cable of claim 1, wherein the convex-concave shape of the metal layer is a smoothly-curved wave, a trapezoidal square wave, or a triangular wave,
    wherein a portion near a wave crest portion or a wave base portion of the convex-concave shape is formed with a smoothly-curved line,
    wherein a wave height of the convex-concave shape of the metal layer is 0.2 mm to 0.6 mm, and
    wherein a wave pitch of the convex-concave shape of the metal layer is 1.5 mm to 4 mm.

3. The undersea cable of claim 1, wherein at least the resin of the multilayer tape on an inner surface side is a conductive resin layer configured to be conductive with the shield layer, and the resin of the multilayer tape on an outer surface side is compatible with the anticorrosion layer and has a lower melting point than a melting point of the anticorrosion layer.

4. The undersea cable of claim 1, wherein an adhesive layer is formed on an outer surface of the resin of the multilayer tape on an outer surface side, and the adhesive layer and the anticorrosion layer are bonded together.

5. The undersea cable of claim 1, wherein a second water shielding layer is formed on an inner surface of the outer anticorrosion layer, and the second water shielding layer is formed using the multilayer tape.

6. The undersea cable of claim 1, wherein the multilayer tape is wound to have both end portions of the multilayer tape in a width direction overlapping each other such that a longitudinal direction of the multilayer tape is substantially the same as the axial direction of the power line cores and a width direction of the multilayer tape is the same as the circumferential direction of the power line cores, and
    wherein an overlapping portion of the multilayer tape is extensible in the axial direction of the power line cores.

7. A method for improving fatigue characteristics of an undersea cable of claim 1, wherein in the undersea cable, a convex-concave shape arranged in a circumferential direction of a multilayer tape improves fatigue characteristics in a radial direction by expansion and contraction, and a convex-concave shape arranged in a longitudinal direction of the multilayer tape improves fatigue characteristics in an axial direction.

8. The method of claim 7, wherein a fatigue characteristic of the multilayer tape of the undersea cable that is measured in a flexural fatigue test at a distortion of 2% is $1*10^5$ times or more.

9. An undersea cable for offshore floating facilities, comprising at least:
- a power line core in which an insulating layer, a shield layer, a first water shielding layer, and an anticorrosion layer are formed on a conductor;
- a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
- an outer anticorrosion layer formed on an outer periphery side of the wire armor member,
- wherein the first water shielding layer is formed using a multilayer tape in which a metal layer is sandwiched by resins,
- wherein a cross sectional shape of the metal layer of the multilayer tape is a corrugated shape,
- wherein on a plane surface of the multilayer tape, wave crest portions of the corrugated shape are formed toward one direction,
- wherein the corrugated shape of the metal layer is a smoothly-curved wave, a trapezoidal square wave, or a triangular wave,
- wherein a portion near a wave crest portion or a wave base portion of the corrugated shape is formed with a smoothly-curved line, and
- wherein a direction in which the corrugated shape is expandable and contractible is substantially the same as an axial direction of the undersea cable.

10. An undersea cable for offshore floating facilities, comprising at least:
- a power line core in which an insulating layer, a shield layer, a first water shielding layer, and an anticorrosion layer are formed on a conductor;
- a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
- an outer anticorrosion layer formed on an outer periphery side of the wire armor member,
- wherein the first water shielding layer is formed using a multilayer tape in which a metal layer is sandwiched by resins,
- wherein a cross sectional shape of the metal layer of the multilayer tape is a corrugated shape,
- wherein on a plane surface of the multilayer tape, wave crest portions of the corrugated shape are formed toward one direction,
- wherein the multilayer tape is wound to have both end portions of the multilayer tape in a width direction overlapping each other such that a longitudinal direction of the multilayer tape is substantially the same as the axial direction of the power line cores and a width direction of the multilayer tape is the same as the circumferential direction of the power line cores, and
- wherein the direction in which the wave crest portions are formed is substantially the same as the circumferential direction of the power line cores.

11. An undersea cable for offshore floating facilities, comprising at least:
- a power line core in which an insulating layer, a shield layer, a first water shielding layer, and an anticorrosion layer are formed on a conductor;
- a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
- an outer anticorrosion layer formed on an outer periphery side of the wire armor member,
- wherein the first water shielding layer is formed using a multilayer tape in which a metal layer is sandwiched by resins,
- wherein a cross sectional shape of the metal layer of the multilayer tape is a corrugated shape,
- wherein on a plane surface of the multilayer tape, wave crest portions of the corrugated shape are formed toward one direction, and
- wherein the multilayer tape is wound helically such that a longitudinal direction of the multilayer tape is at a predetermined angle with respect to the axial direction of the power line cores, and the direction in which the wave crest portions are formed is substantially the same as the circumferential direction of the power line cores.

12. An undersea cable for offshore floating facilities, comprising at least:
- a power line core in which an insulating layer, a shield layer, a first water shielding layer, and an anticorrosion layer are formed on a conductor;
- a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
- an outer anticorrosion layer formed on an outer periphery side of the wire armor member,
- wherein the first water shielding layer is formed using a multilayer tape in which a metal layer is sandwiched by resins,
- wherein a cross sectional shape of the metal layer of the multilayer tape is a corrugated shape,
- wherein on a plane surface of the multilayer tape, wave crest portions of the corrugated shape are formed toward one direction, and
- wherein at least the resin of the multilayer tape on an inner surface side is a conductive resin layer configured to be conductive with the shield layer, and the resin of the multilayer tape on an outer surface side is compatible with the anticorrosion layer and has a lower melting point than a melting point of the anticorrosion layer.

13. An undersea cable for offshore floating facilities, comprising at least:
- a power line core in which an insulating layer, a shield layer, a first water shielding layer, and an anticorrosion layer are formed on a conductor;
- a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
- an outer anticorrosion layer formed on an outer periphery side of the wire armor member, wherein the first water shielding layer is formed using a multilayer tape in which a metal layer is sandwiched by resins, wherein a cross sectional shape of the metal layer of the multilayer tape is a corrugated shape, wherein on a plane surface of the multilayer tape, wave crest portions of the corrugated shape are formed toward one direction, and wherein an adhesive layer is formed on an outer surface of the resin of the multilayer tape on an outer surface side, and the adhesive layer and the anticorrosion layer are bonded together.

14. An undersea cable for offshore floating facilities, comprising at least:
   a power line core in which an insulating layer, a shield layer, a first water shielding layer, and an anticorrosion layer are formed on a conductor;
   a wire armor member formed by providing, on an outer periphery side of the power line cores as a whole, a plurality of wire rods in a circumferential direction of the outer periphery of the power line cores, and arranging the plurality of wire rods helically in an axial direction of the power line cores; and
   an outer anticorrosion layer formed on an outer periphery side of the wire armor member,
   wherein the first water shielding layer is formed using a multilayer tape in which a metal layer is sandwiched by resins,
   wherein a cross sectional shape of the metal layer of the multilayer tape is a corrugated shape,
   wherein on a plane surface of the multilayer tape, wave crest portions of the corrugated shape are formed toward one direction, and
   wherein a second water shielding layer is formed on an inner surface of the outer anticorrosion layer, and the second water shielding layer is formed using the multilayer tape.

* * * * *